(12) United States Patent
Finn et al.

(10) Patent No.: US 6,911,095 B1
(45) Date of Patent: Jun. 28, 2005

(54) METHOD OF PROCESSING GLASS SWARF

(75) Inventors: Bradley Finn, West Bloomfield, MI (US); Jo Finn, West Bloomfield, MI (US)

(73) Assignee: Slagease, L.L.C., Birmingham, MI (US)

( * ) Notice: Subject to any disclaimer, the term of this patent is extended or adjusted under 35 U.S.C. 154(b) by 147 days.

(21) Appl. No.: 10/289,046

(22) Filed: Nov. 6, 2002

Related U.S. Application Data

(60) Provisional application No. 60/332,617, filed on Nov. 6, 2001.

(51) Int. Cl.$^7$ ................................................ B08B 7/00
(52) U.S. Cl. ................... 134/7; 134/10; 134/42
(58) Field of Search ................. 134/7, 25.4, 32, 134/42, 10

(56) References Cited

U.S. PATENT DOCUMENTS

| | | | | |
|---|---|---|---|---|
| 4,097,306 A | * | 6/1978 | Carman | 134/10 |
| 5,888,119 A | * | 3/1999 | Christianson et al. | 451/41 |
| 6,645,624 B2 | * | 11/2003 | Adefris et al. | 428/402 |

* cited by examiner

*Primary Examiner*—Michael Barr
*Assistant Examiner*—Saeed Chaudhry
(74) *Attorney, Agent, or Firm*—Rader, Fishman & Grauer PLLC

(57) ABSTRACT

Relatively small particles of glass (i.e., glass swarf) are generated as a by-product of glass grinding, typically performed to smooth edges of a glass product. Disclosed herein is an inventive method of reducing the tendency of the glass swarf to accumulate and harden, thereby improving the ability to maintain a glass grinding facility. According to the present invention, a loosening agent is mixed with the glass swarf to prevent it from accumulating and hardening.

9 Claims, 1 Drawing Sheet

METHOD OF PROCESSING GLASS SWARF

RELATED APPLICATIONS

This application claims priority to U.S. Provisional Application No. 60/332,617 filed on Nov. 6, 2001, which is incorporated by reference in its entirety.

FIELD OF THE INVENTION

The present invention relates to a method and system for processing glass, and, more particularly, to a method and system for processing glass swarf, a bi-product of glass grinding processes.

BACKGROUND

Glass is used for a wide variety of products, including by way of example, automobile windshields, building windows, drinking glasses, trinkets, eyeglasses, etc. A typical part of the finishing process for many glass products includes glass grinding, which is commonly done to contour and smooth glass edges. A by-product of the glass grinding process includes small glass particles that are separated from the finished piece of glass. These glass particles are sometimes referred to as glass "swarf."

In glass processing facilities, the swarf typically accumulates on the floor of the facility. When glass swarf accumulates, it tends to compact and harden, even when saturated with water, which makes it difficult and inconvenient to remove from the facility. Various processes are currently used to facilitate the removal of the slag, including water circulation (irrigation) systems, which basically uses water as a medium to whisk away the swarf before it any significant amount can accumulate on the floor. While existing systems (such as irrigation systems) are effective in removing glass swarf from the immediate grinding site, the swarf still tends to accumulate and harden at other locations—such as in system equipment, drain lines, dump vats, etc.—once it is removed from the immediate grinding site. Hardened glass swarf causes significant problems and expense associated with removing it. Despite the presence of water, hardened glass slag often must be forcibly removed with heavy equipment such as jackhammers. Maintenance and replacement of specialized systems is costly and is attributed to the difficulty in handling glass slag. Furthermore, costs are incurred for manufacturing downtime while the valuable glass grinding systems undergo lengthy maintenance.

Accordingly, the inventor has recognized that it would be desirable to have a process that would provide an effective way to process glass swarf so as to avoid other costly processes for removing hardened glass swarf. Such a process would reduce costs for system maintenance, system downtime, and swarf handling.

SUMMARY OF THE INVENTION

The present invention is a method for processing glass swarf so that it does not harden, thus making maintenance procedures relating to glass swarf more efficient and less costly. After glass swarf is created as a by-product of glass grinding, a "loosening agent" is added to the glass grinding process at some point so as to mix with the glass swarf and prevent it from hardening. The loosening agent can comprise a variety of compositions that have the effect of preventing glass swarf from sticking together and/or hardening. When the glass swarf is prevented from sticking together and hardening, it can more easily be washed away, without expensive removal equipment and processes.

DETAILED DESCRIPTION OF AN EMBODIMENT OF THE INVENTION

Figure 1:
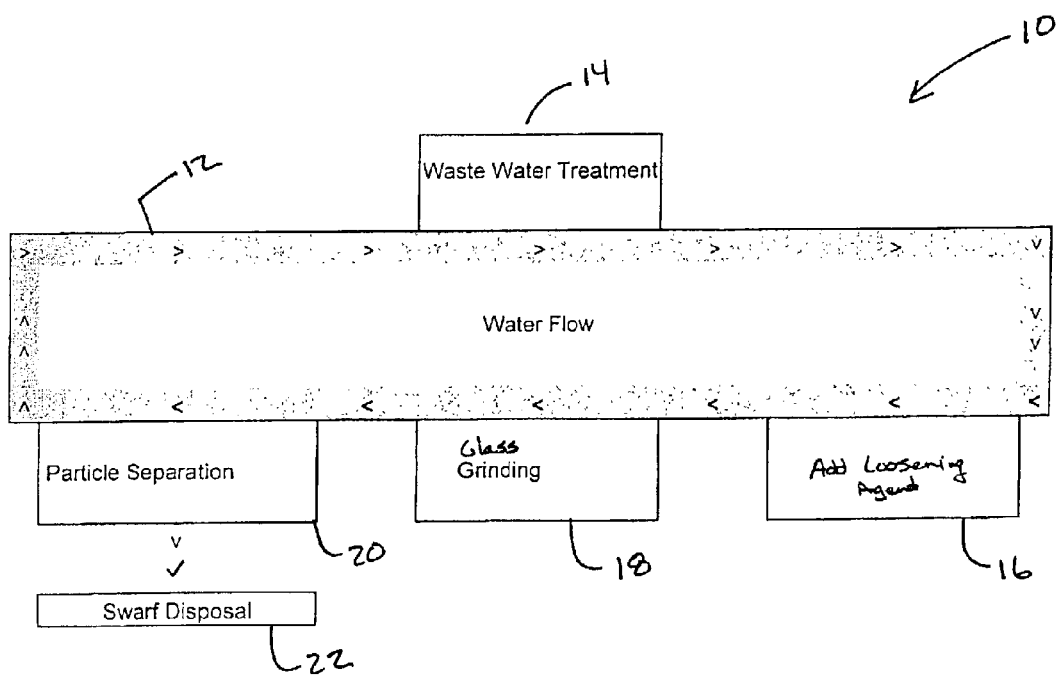
FIG. 1 is a schematic diagram of a method for processing glass swarf, according to an embodiment of the invention.

FIG. 1 illustrates one embodiment of a glass swarf process, according to the present invention. A glass processing system 10 is schematically illustrated in FIG. 1. The glass processing system 10 includes a water flow path 12. The water flow path can be an irrigation system commonly found in existing glass processing facilities, or it can simply be water sources (such as hoses) and drains in the floor of the glass grinding facility. Basically, the water flow path 12 can comprise a variety of different arrangements, with the purpose of the water flow path being to provide a medium to carry loose glass swarf away from the glass grinding site. As illustrated, the water flow path 12 passes through a waste water treatment location 14, a glass grinding location 18, and a particle separation location 20. Reference numeral 16 represents an illustrative point along the water flow path where a loosening agent can be added to prevent the glass swarf from hardening. Reference numeral 22 generically represents a location where the treated glass swarf can be disposed of subsequently to be removed from the water flow path 12. While illustrated separately in FIG. 1, the waste water treatment location 14, the glass grinding location 18, and the particle separation location 20 can be physically located in the same facility or in separate facilities. Moreover, the functions associated with these three locations 14, 18, and 20 could be combined at a single physical location within the same facility. In short, reference numerals 14, 18 and 20 refer more to the functions to be accomplished at the illustrated "locations", as opposed to the actual physical locations at which they are performed.

In application, glass products are processed at the glass grinding location 18. As described above, the glass products go through a grinding process, typically to finish the edges of the glass products. The grinding process produces a by-product of glass swarf, which typically falls to the floor during the grinding process. A flow of water 12 passes along the floor of the glass grinding location 18 to whisk the glass swarf away from the grinding site. As suggested above, the water flow through the grinding location 18 does not need to take this form. Rather, the water flow 12 through the glass grinding location 18 could be in the form of a periodic use of a hose or other water source to selectively generate a water flow to wash away the glass swarf from the floor.

After the glass swarf is removed from the grinding location 18, it transported, preferably by the water flow 12, a particle separation device 20. The particle separation device 20 can take a variety of forms, including a centrifugal separator, filter, or other mechanism that functions to remove particulate from a fluid.

At some point in the water flow path 12, a loosening agent is added to the water. The loosening agent is an additive that has the ability to reduce the tendency of glass swarf to accumulate and harden. One effective loosening agent is sodium bi-carbonate, though it is contemplated that other loosening agents could be used and are within the scope of this invention. The loosening agent can be added to the water flow and/or the glass swarf at several different locations in the process, provided that it is added in such as way as to reduce the tendency of the glass swarf to accumulate and harden. As illustrated in FIG. 1, the loosening agent can be added to the water flow 12 at a point before the water 12 reaches the glass grinding location 18.

The water flow 12 passes through the glass grinding location 18 picking up the glass swarf on the floor as it passes. The loosening agent in the water flow 12 reduces the tendency of the glass swarf to accumulate and harden, thereby making it less likely that the swarf will accumulate on the floor of the glass grinding area.

The water flow 12 (with the swarf particulate) typically passes through floor drains (not shown) to the particle separation area 20. The swarf particulate is then separated from the water, and the swarf particulate is disposed of at reference numeral 22. The water flow (without the swarf particulate) then typically passes to the waste water treatment location 14, where the water is filtered and otherwise treated according to known methods. The loosening agent is typically removed from the water flow 12 at the waste water treatment area 14. The treated water is then recycled through the water flow path 12 as described above.

The presence of the loosening agent in the water flow decreases the likelihood that the glass swarf will accumulate and harden in the various locations, including on the floor of the glass grinding area, in the floor drains, and in the particle separation equipment. As a result, the loosening agent eliminates the need for expensive and time-consuming processes for removing and disposing of hardened glass swarf. Moreover, the loosening agent reduces maintenance costs associated with the various equipment because it is less likely that glass swarf will cause such equipment to break down.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements. Further, the use of the words "first", "second", and the like do not alone imply any temporal order to the elements identified. The invention is limited by the following claims.

What is claimed is:

1. A method for processing glass swarf, comprising the step of mixing the glass swarf with a loosening agent, wherein said loosening agent is sodium bicarbonate.

2. The method of claim 1, wherein said loosening agent is a sodium bicarbonate solution.

3. The method of claim 1, further comprising the step of providing a water flow through an area having glass swarf; and wherein said mixing step comprises adding said loosening agent to said water flow upstream of said area having glass swarf.

4. The method of claim 3, further comprising the step of separating said glass swarf from said water flow.

5. The method of claim 1, further comprising the step of separating said glass swarf from said loosening agent.

6. The method of claim 1, further comprising the step of providing a water flow through an area having glass swarf; and wherein said mixing step comprises adding said loosening agent to said water and said swarf.

7. A method of processing glass, comprising the steps:

grinding a glass product, thereby producing glass swarf as a by-product; and mixing said glass swarf with a loosening agent, wherein said loosening agent is sodium bicarbonate.

8. The method of claim 7, further comprising the steps:

providing water to said glass swarf; and mixing said loosening agent with said glass swarf and said water.

9. The method of claim 8, further comprising the step of separating said glass swarf from said water and said loosening agent.

\* \* \* \* \*